US012583092B2

(12) United States Patent
Nemec et al.

(10) Patent No.: US 12,583,092 B2
(45) Date of Patent: Mar. 24, 2026

(54) HYBRID THERMOPLASTIC COMPOSITES FOR POWER TOOLS AND POWER TOOL COMPONENTS

(71) Applicant: Milwaukee Electric Tool Corporation, Brookfield, WI (US)

(72) Inventors: Jacob N. Nemec, Waldo, WI (US); Kentez L. Craig, Milwaukee, WI (US); Amith J. Baskaran, Menomonee Falls, WI (US); Marcus M. Wechselberger, West Allis, WI (US); David C. Graf, Greendale, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/621,648

(22) Filed: Mar. 29, 2024

(65) Prior Publication Data

US 2024/0308050 A1 Sep. 19, 2024

Related U.S. Application Data

(63) Continuation of application No. PCT/US2024/020188, filed on Mar. 15, 2024.

(60) Provisional application No. 63/490,961, filed on Mar. 17, 2023.

(51) Int. Cl.
*B25F 5/02* (2006.01)
*B25C 1/04* (2006.01)

(52) U.S. Cl.
CPC ................ *B25F 5/02* (2013.01); *B25C 1/047* (2013.01)

(58) Field of Classification Search
CPC .................................. B25F 5/02; B25C 1/047
See application file for complete search history.

(56) References Cited

U.S. PATENT DOCUMENTS

| | | | | | |
|---|---|---|---|---|---|
| 4,380,483 | A * | 4/1983 | Kliger | B29C 70/04 | 156/169 |
| 4,700,876 | A * | 10/1987 | Wingert | B25C 5/15 | 227/156 |
| 4,858,813 | A * | 8/1989 | Wingert | B25C 5/15 | 227/156 |
| 5,418,339 | A * | 5/1995 | Bowen | B25D 17/12 | 173/DIG. 2 |
| 7,310,879 | B1 * | 12/2007 | Clarke | B27B 5/08 | 451/451 |

(Continued)

FOREIGN PATENT DOCUMENTS

| | | | | |
|---|---|---|---|---|
| CN | 104174896 A | * 12/2014 | B23B 45/02 |
| JP | 2001-081246 | 3/2001 | |
| JP | 2014-162414 | 9/2014 | |

OTHER PUBLICATIONS

International Search Report and Written Opinion for International Application No. PCT/US2024/020188, dated Aug. 16, 2024, 14 pages.

*Primary Examiner* — Lucas E. A. Palmer
(74) *Attorney, Agent, or Firm* — Reinhart Boerner Van Deuren s.c.

(57) ABSTRACT

Embodiments of the disclosure relate to a power tool. The power tool includes at least one hybrid composite component. The hybrid composite component includes a housing component and a composite component. The composite component is made of a first thermoplastic polymer matrix filled with long fibers in which most of the long fibers have a length of at least 0.5 inches.

20 Claims, 10 Drawing Sheets

(56) References Cited

U.S. PATENT DOCUMENTS

| | | | | |
|---|---|---|---|---|
| 10,173,310 | B2 | 1/2019 | Wyler et al. | |
| 10,442,066 | B2 * | 10/2019 | Nishikawa | B25C 7/00 |
| 10,510,199 | B2 | 12/2019 | Hoossainy et al. | |
| 11,673,248 | B2 | 6/2023 | Verbrugge et al. | |
| 2004/0049926 | A1 * | 3/2004 | Miklosz | B25F 5/02 30/388 |
| 2005/0252670 | A1 * | 11/2005 | Prell | B25F 5/001 173/39 |
| 2006/0033290 | A1 * | 2/2006 | Fuchs | F16J 15/061 173/217 |
| 2007/0007319 | A1 * | 1/2007 | Simonelli | B25C 1/06 227/132 |
| 2007/0266831 | A1 * | 11/2007 | Matthias | B25F 5/02 81/177.1 |
| 2008/0017689 | A1 * | 1/2008 | Simonelli | B25C 1/06 227/132 |
| 2009/0236387 | A1 * | 9/2009 | Simonelli | B25F 5/006 227/8 |
| 2010/0116517 | A1 * | 5/2010 | Katzenberger | G09F 7/00 429/90 |
| 2011/0040022 | A1 | 2/2011 | Hirofumi et al. | |
| 2011/0094764 | A1 * | 4/2011 | Wei | F21V 33/0084 173/122 |
| 2014/0073731 | A1 * | 3/2014 | Inamdar | C08L 23/10 524/528 |
| 2016/0378097 | A1 * | 12/2016 | Crescenti | G05B 19/408 700/170 |
| 2017/0086496 | A1 * | 3/2017 | Cameron | B25F 1/04 |
| 2017/0113338 | A1 * | 4/2017 | Tien | F04B 41/00 |
| 2021/0316436 | A1 * | 10/2021 | Hurley | B44D 3/162 |
| 2021/0323135 | A1 | 10/2021 | Lübkert et al. | |
| 2021/0402494 | A1 * | 12/2021 | Rasooli | B27B 17/0008 |
| 2022/0032441 | A1 | 2/2022 | Wierzchon | |
| 2022/0347828 | A1 * | 11/2022 | Wen | B25F 5/02 |
| 2023/0055198 | A1 * | 2/2023 | Yue | F16D 43/206 |
| 2023/0158587 | A1 * | 5/2023 | König | B23D 49/162 30/124 |
| 2023/0390881 | A1 * | 12/2023 | Beiermann | B24B 23/02 |
| 2024/0208029 | A1 * | 6/2024 | Diehl | B27B 17/0033 |

* cited by examiner

HYBRID THERMOPLASTIC COMPOSITES FOR POWER TOOLS AND POWER TOOL COMPONENTS

CROSS-REFERENCE TO RELATED PATENT APPLICATIONS

The present application is a continuation of International Application No. PCT/US2024/020188, filed Mar. 15, 2024, which claims the benefit of and priority to U.S. Application No. 63/490,961 filed on Mar. 17, 2023, each of which is incorporated herein by reference in its entirety.

BACKGROUND OF THE INVENTION

The present disclosure relates to a composite material used to reinforce portions or components of a power tool.

SUMMARY OF THE INVENTION

In a first aspect, embodiments of the disclosure relate to a power tool. The power tool includes at least one hybrid composite component. The hybrid composite component includes a housing component and a composite component. The composite component is made of a first thermoplastic polymer matrix filled with long fibers, and most of the long fibers have a length of at least 0.5 inches.

A second aspect relates to the power tool of the first aspect in which the first thermoplastic polymer matrix of the composite component includes at least one of a polyamide (PA), a polycarbonate (PC), a polypropylene (PP), polyphthalamide (PPA), poly(butylene terephthalate) (PBT), poly (acrylonitrile:budadiene:styrene) (ABS), or polyketone (POK).

A third aspect relates to the power tool of the first aspect or the second aspect in which the long fibers include fibers selected from glass, carbon, aramid, basalt, ultra-high molecular weight polyethylene, and combinations thereof.

A fourth aspect relates to the power tool of any of the first aspect to the third aspect in which the long fibers are randomly oriented.

A fifth aspect relates to the power tool of any of the first aspect to the fourth aspect in which most of the long fibers are oriented within 15° of a common direction.

A sixth aspect relates to the power tool of any of the first aspect to the fifth aspect in which the composite component includes a plurality of layers and in which each layer of the plurality of layers includes the first thermoplastic polymer matrix filled with the long fibers.

A seventh aspect relates to the power tool of the sixth aspect in which the long fibers in each layer of the plurality of layers are oriented within 150 of a common direction and in which the common direction of a first layer of the plurality of layers is rotated about 450 or about 90° to the common direction of an adjacent second layer of the plurality of layers.

An eighth aspect relates to the power tool of any of the first aspect to the seventh aspect in which the hybrid composite component has a thickness and in which the composite component makes up to 80% of the thickness.

A ninth aspect relates to the power tool of any of the first aspect to the eighth aspect in which the composite component is attached to the housing component without adhesive.

A tenth aspect relates to the power tool of any of the first aspect to the third aspect in which the housing component is formed from a same thermoplastic polymer as the first thermoplastic polymer matrix or a second thermoplastic polymer that is compatible with the first thermoplastic polymer matrix.

An eleventh aspect relates to the power tool of the tenth aspect in which the housing component includes short fibers embedded in the same thermoplastic polymer or the second thermoplastic polymer and in which most of the short fibers have a length of less than 0.5 inches.

A twelfth aspect relates to the power tool of any of the first through eleventh aspects in which the at least one hybrid composite component comprises an endcap of an impact driver.

A thirteenth aspect relates to the power tool of any of the first aspect to the twelfth aspect in which the at least one hybrid composite component comprises a handle portion.

A fourteenth aspect relates to the power tool of any of the first aspect to the thirteenth aspect in which the at least one hybrid composite component comprises a battery pack.

A fifteenth aspect relates to the power tool of any of the first aspect to the eleventh aspect in which the power tool is a fastener driver comprising a gas spring mechanism, in which the gas spring mechanism comprises a piston sleeve, and in which the at least one hybrid composite component comprises the piston sleeve.

In a sixteenth aspect, embodiments of the present disclosure relate to a power tool. The power tool includes a housing formed from a first thermoplastic polymer. The power tool further includes a composite component that reinforces a local area of the housing. The composite component is formed from a matrix filled with long fibers, and the matrix includes a second thermoplastic polymer. The first thermoplastic polymer of the housing is melt bonded to the second thermoplastic polymer of the composite component.

A seventeenth aspect relates to the power tool of the sixteenth aspect in which most of the long fibers have a length of at least 0.5 inches.

An eighteenth aspect relates to the power tool of the sixteenth aspect or the seventeenth aspect in which the composite component includes from 50% by weight to 70% by weight of the long fibers.

A nineteenth aspect relates to the power tool of any of the sixteenth aspect to the eighteenth aspect in which the composite component has a first thickness in a range from 0.1 mm to 3 mm.

A twentieth aspect relates to the power tool of the nineteenth aspect in which the local area of the housing has a second thickness, in which the first thickness and the second thickness together equal a total thickness, and in which the first thickness is up to 80% of the total thickness.

In a twenty-first aspect, embodiments of the disclosure relate to an impact driver. The impact driver includes a housing having a head portion and a handle portion. An end effector is disposed on a first side of the first portion, and the end effector is configured to hold a bit configured for drilling or for driving a fastener. An endcap is disposed on a second side of the first portion opposite to the end effector. A trigger is disposed in the handle portion, and the trigger is configured to actuate the end effector. The endcap is a hybrid composite component having a housing component and a composite component. The composite component includes long fibers disposed within a matrix of a first thermoplastic polymer.

A twenty-second aspect relates to the impact driver of the twenty-first aspect in which the housing component includes a second thermoplastic polymer and in which the second thermoplastic polymer of the housing component is melt bonded to the first thermoplastic polymer of the composite component.

A twenty-third aspect relates to the impact driver of the twenty-first aspect or the twenty-second aspect in which the endcap is configured to deflection at most 3 mm upon application of a force of 550 lbf on the housing normal to the housing component.

In a twenty-fourth aspect, embodiments of the disclosure relate to a battery pack. The battery pack comprises a first housing component and a second housing component configured to mate with the first housing component. The battery pack further comprises a plurality of battery cells disposed within the first housing component and the second housing component when the first housing component is mated to the second housing component. The second housing component comprises a plurality of sidewalls and a plurality of corners in which each sidewall of the plurality of sidewalls is connected to an adjacent sidewall at a corner of the plurality of corners. At least one sidewall or corner is reinforced with a composite component, and the composite component comprises a thermoplastic polymer matrix filled with long fibers.

A twenty-fifth aspect relates to the battery pack of the twenty-fourth aspect in which most of the long fibers have a length of at least 0.5 inches.

A twenty-sixth aspect relates to the battery pack of the twenty-fourth aspect or the twenty-fifth aspect in which the composite component comprises from 50% by weight to 70% by weight of the long fibers.

A twenty-seventh aspect relates to the battery pack of any of the twenty-fourth aspect to the twenty-sixth aspect in which the thermoplastic polymer matrix comprises a first thermoplastic polymer, in which the second housing component comprises a second thermoplastic polymer, and in which the first thermoplastic polymer is melt bonded to the second thermoplastic polymer.

In a twenty-eighth aspect, embodiments of the disclosure relate to a fastener driver. The fastener driver includes a cylinder housing. A storage chamber is disposed within the cylinder housing, and the storage chamber is configured to hold a pressurized gas. A piston sleeve is disposed within the gas storage chamber, and a piston is configured to translate linearly within the piston sleeve. A driver blade is attached to the piston such that movement of the piston causes movement of the driver blade to drive a fastener into a workpiece. The piston sleeve comprises an outer layer defining a cylindrical tube and a collar. An interior of the collar is reinforced with a composite component comprising a thermoplastic polymer matrix filled with long fibers.

A twenty-ninth aspect relates to the fastener driver of the twenty-eighth aspect in which the cylindrical tube is lined with an aluminum bore.

A thirtieth aspect relates to the fastener driver of the twenty-eighth aspect or the twenty-ninth aspect in which the thermoplastic polymer matrix of the composite component includes at least one of a polyamide (PA), a polycarbonate (PC), a polypropylene (PP), polyphthalamide (PPA), poly (butylene terephthalate) (PBT), poly(acrylonitrile:budadiene:styrene) (ABS), or polyketone (POK).

A thirty-first aspect relates to the fastener driver of the twenty-eighth aspect to the thirtieth aspect in which the long fibers include fibers selected from glass, carbon, aramid, basalt, ultra-high molecular weight polyethylene, and combinations thereof.

A thirty-second aspect relates to the fastener driver of the twenty-eighth aspect to the thirty-first aspect in which the long fibers are randomly oriented.

A thirty-third aspect relates to the fastener driver of the twenty-eighth aspect to the thirty-second aspect in which most of the long fibers are oriented within 150 of a common direction.

A thirty-fourth aspect relates to the fastener driver of the twenty-eighth aspect to the thirty-third aspect in which the composite component includes a plurality of layers and in which each layer of the plurality of layers includes the thermoplastic polymer matrix filled with the long fibers.

A thirty-fifth aspect relates to the fastener driver of the thirty-fourth aspect in which the long fibers in each layer of the plurality of layers are oriented within 150 of a common direction and in which the common direction of a first layer of the plurality of layers is rotated about 450 or about 90° to the common direction of an adjacent second layer of the plurality of layers.

A thirty-sixth aspect relates to the fastener driver of the twenty-eighth aspect to the thirty-fifth aspect in which the collar has a radial thickness and in which the composite component makes up to 80% of the radial thickness.

A thirty-seventh aspect relates to the fastener driver of the twenty-eighth aspect to the thirty-sixth aspect in which the composite component is attached to the outer layer without adhesive.

A thirty-eighth aspect relates to the fastener driver of the thirty-seventh aspect in which the composite component is melt bonded to the outer layer.

A thirty-ninth aspect relates to the fastener driver of the twenty-eighth aspect to the thirty-eighth aspect in which the outer layer is formed from a same thermoplastic polymer as the thermoplastic polymer matrix or a second thermoplastic polymer that is compatible with the thermoplastic polymer matrix.

A fortieth aspect relates to the fastener driver of the thirty-ninth aspect in which the outer layer includes short fibers embedded in the same thermoplastic polymer or the second thermoplastic polymer and in which most of the short fibers have a length of less than 0.5 inches.

Additional features and advantages will be set forth in the detailed description which follows, and will be readily apparent to those skilled in the art from the description or recognized by practicing the embodiments as described in the written description and/or shown in the accompany drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments. In addition, alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Various aspects of the disclosure relate to embodiments of a hybrid composite component of a power tool configured to provide locally enhanced stiffness and strength of a housing.

Because of the rugged nature of construction, power tools are frequently subjected to a variety of loads. For example, power tools are often used by operators on ladders or the roof of a structure, and thus, such power tools may be subject to falls from large heights. Additionally, power tools may be subjected to significant forces imposed by the operator when working on a tough material. As such, power tools should be mechanically robust enough to withstand reasonable mechanical loads. Further, there is also a need to provide a lightweight product that an operator can utilize for long periods of time. One way to enhance mechanical robustness is to use stronger materials, but such exchange of materials often comes with a concomitant increase in weight. Applicant has recognized a need in the art to balance these potentially competing aspects of power tool design and has developed a solution that provides enhanced mechanical properties without significantly increasing weight.

As will be discussed more fully below, disclosed embodiments of the hybrid composite component provide such enhanced mechanical properties, in particular enhanced stiffness and strength, without increasing or without substantially increasing the weight of the power tool. According to embodiments, the hybrid composite component includes a housing component and a composite component. The housing component is formed from a thermoplastic polymer, and the composite component includes a thermoplastic polymer matrix filled with long fibers. In one or more embodiments, the housing component provides a desired aesthetic and tactile finish for the exterior of the power tool, whereas the composite component enhances the stiffness and strength of the housing component. Advantageously, the composite component does not increase or does not substantially increase the size of the housing, and unlike other rigid materials, such as metals, the composite component can be non-conductive and lighter in weight. These and other aspects and advantages will be described below in relation to exemplary embodiments and in relation to the accompanying figures, and such discussion is provided by way of illustration and not limitation.

Figure 1:
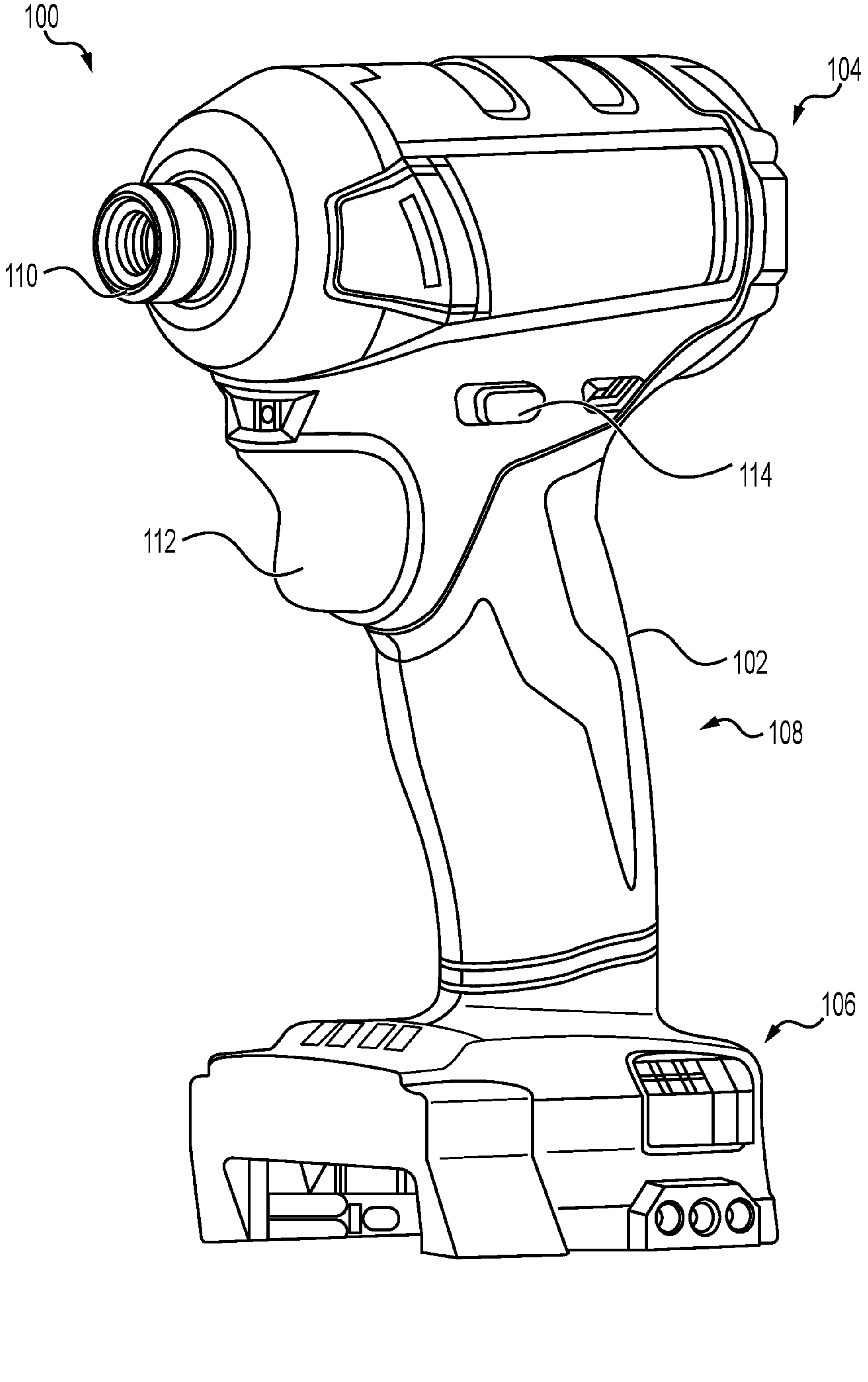
FIG. 1 depicts a perspective view of a power tool, in particular, an impact driver, according to an embodiment of the present disclosure.

FIG. 1 provides an embodiment of a power tool 100, which is depicted as an impact driver; however, the power tool 100 can be any of a variety of power tools, such as a drill, a hammer drill, a circular saw, a reciprocating saw, an oscillating saw, a jigsaw, an angle grinder, a fastener driver, a sander, a pipe cutter, or a cable cutter, among other possibilities. The power tool 100 includes a housing 102. In one or more embodiments, the housing 102 encloses the electronic and electromechanical components used to operate the power tool 100.

In one or more embodiments, the housing 102 includes a first portion 104 and a handle portion 108. In the embodiment depicted, the first portion 104 is a head portion with an end effector 110 of the power tool 100, and in the embodiment depicted, the end effector 110 is configured to hold a bit for driving a fastener or for drilling. Further, in the embodiment depicted, the handle portion 108 has a trigger 112 formed therein to actuate the end effector 110. In the embodiment depicted, the first portion 104 includes a selector 114 configured to select the direction in which the end effector 110 is driven (e.g., forward or reverse). In one or more embodiments, including the embodiment depicted, the housing 102 further includes a second portion 106, and the second portion 106 of the power tool 100 is configured to receive a battery pack 116 (as shown in FIG. 2).

Figure 2:
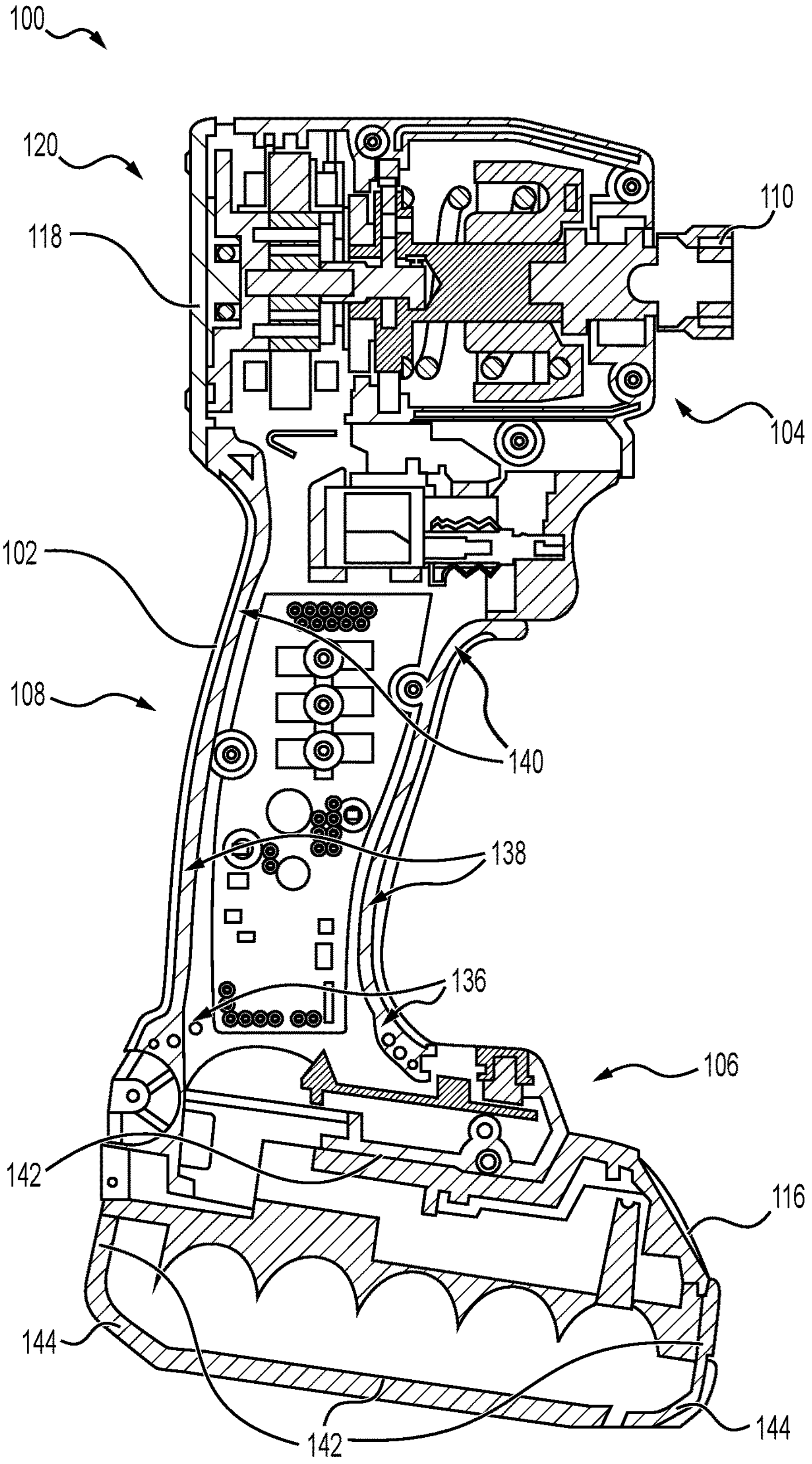
FIG. 2 depicts a cross-sectional view of the power tool of FIG. 1 with a battery pack, according to an embodiment of the present disclosure.

As will be discussed more fully in relation to the depicted embodiments, the first portion 104 includes an endcap 118 as shown in FIG. 2. For a power tool 100 that is, in particular, an impact driver, the endcap 118 is disposed on one side of the first portion 104, and the end effector 110 is disposed on an opposite side of the first portion 104 such that the endcap 118 and the end effector 110 are in linear alignment. An operator of the power tool 100 may use the endcap 118 to apply pressure to the end effector 110. For example, an operator may press, e.g., a knee, elbow, or shoulder against endcap 118 of the impact driver to apply pressure to the end effector 110 of the impact driver while driving fasteners or a drill bit. If the endcap 118 is not sufficiently stiff and strong, the endcap 118 may bow inwardly and potentially contact the interior components of the housing 102, which can cause the components to operate improperly or degrade. Accordingly, in one or more embodiments according to the present disclosure, the housing 102 includes one or more local areas, such as the endcap 118 that is reinforced with a composite material. Other portions that are particularly suitable for reinforcement (of the impact driver in particular or of other power tools generally) include the handle portion 108 and the battery pack 116, which are particularly susceptible to breaking when the power tool is dropped from height (such as when the operator is on a ladder or roof).

Figure 3:
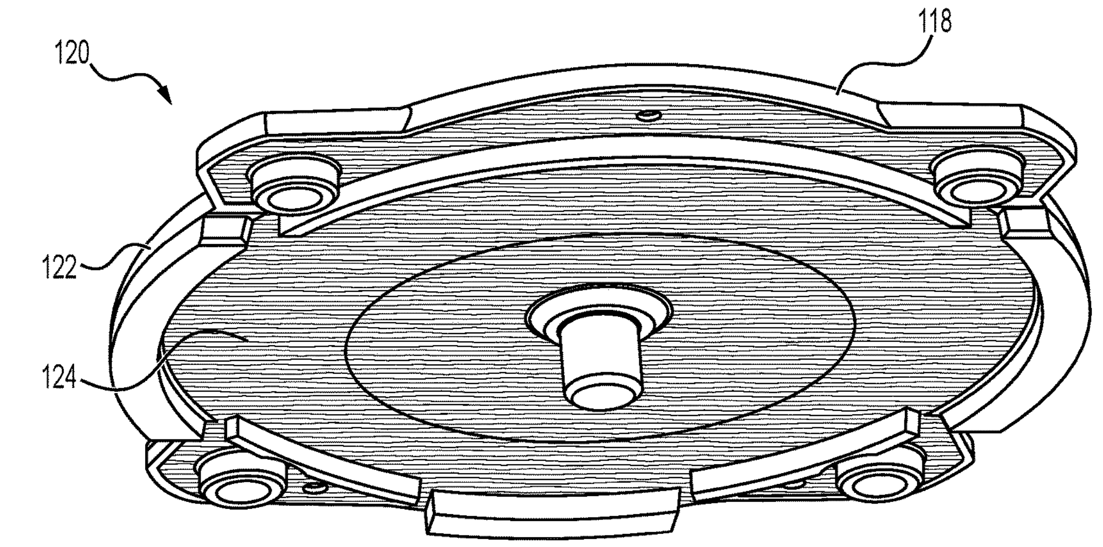
FIG. 3 depicts a hybrid composite component, in particular an endcap, of a power tool, according to an embodiment of the present disclosure.

FIG. 3 depicts a hybrid composite component 120 in the form of a reinforced endcap 118. In such an embodiment, the endcap 118 may be considered the localized area of the housing 102 that is reinforced. In general, the hybrid composite component 120, such as the endcap 118, includes a housing component 122, which is visible on the exterior of the housing 102, and a composite component 124, which reinforces the housing component 122.

According to the present disclosure, the composite component 124 is formed from a thermoplastic polymer matrix filled with long fibers. In one or more embodiments, the long fibers are considered "long" if most of the fibers (i.e., >50%) have a length that is at least 0.5 inches long. In one or more embodiments, the long fibers include fibers in which at least 55%, at least 60%, at least 65%, at least 70%, at least 75%, at least 80%, at least 85%, at least 90%, at least 95%, or up to 100% of the fibers have a length of at least 0.5 inches. In one or more embodiments, the length of the fiber necessary to qualify at "long" is at least 0.75 inches, at least 1 inch, at least 1.25 inches, at least 1.5 inches, at least 1.75 inches, at least 2 inches, at least 2.25 inches, at least 2.5 inches, at least 2.5 inches, at least 2.75 inches, or at least 3 inches. Such fibers are distinct from short fibers in which most of the fibers have a length less than 0.5 inches, in particular less than 0.25 inches, and often about 1⁄32 of an inch or less.

In one or more embodiments, the long fibers include fibers that are selected from glass fibers (e.g., E-glass or S-glass), carbon fibers (e.g., 1 k tow to 50 k tow), aramid fibers, basalt fibers, ultra-high molecular weight polyethylene fibers, and combinations thereof.

In one or more embodiments, the thermoplastic polymer matrix of the composite component 124 includes at least one of a polyamide (PA) (e.g., polyamide 6, polyamide 66, or polyamide 12), a polycarbonate (PC), a polypropylene (PP), a polyphthalamide (PPA), a poly(butylene terephthalate) (PBT), a poly(acrylonitrile:budadiene:styrene) (ABS), or a polyketone (POK). In one or more embodiments, the thermoplastic polymer of the composite component is a blend of two or more of the foregoing thermoplastic polymers, such as blends of PC/ABS, PC/PBT, or PA/ABS, among other possibilities.

In one or more embodiments, the composite component 124 includes at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, or up to 70% by weight of the long fibers. In one or more particular embodiments, the composite component 124 includes from 50% by weight to 70% by weight, in particular 60% by weight to 65% by weight, of the long fibers.

In one or more embodiments, the composite component 124 includes at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, or up to 80% by weight of the thermoplastic polymer matrix. In one or more particular embodiments, the composite component includes from 20% by weight to 80% by weight, in particular 30% by weight to 60% by weight of the thermoplastic polymer matrix.

In one or more embodiments, the composite component 124 also includes up to 10% by weight (typically 5% by weight or less) of various processing and/or performance additives dispersed in the thermoplastic polymer matrix. Such additives may include heat stabilizers, anti-oxidants, colorants, lubricating additives, flame retardants, anti-statics, and thermally/electrically conductive fillers. In one or more embodiments in which the composite component 124 is used for battery pack applications, especially for lithium-ion battery packs, the composite component 124 includes a flame retardant additive, an anti-oxidant, and a heat stabilizer.

In the composite component 124, the long fibers are embedded in the thermoplastic polymer matrix such that the thermoplastic polymer matrix serves as a binder for the long fibers. In one or more embodiments, the long fibers are randomly oriented in the composite component 124. Random orientation of the fibers within the composite component 124 may provide substantially uniform properties regardless of the direction of application of a force. In one or more embodiments, the long fibers are substantially unidirectionally oriented within the composite component 124. In one or more embodiments, at least 50% of the long fibers are oriented within 15°, in particular within 10°, and most particularly within 5°, of a common direction. In such embodiments, the unidirectional orientation may provide enhanced strength along the direction of orientation (e.g., the composite component 124 may have enhanced resistance to tensile loads applied in the direction of orientation than tensile loads applied transverse to the orientation direction). Random and unidirectional orientation of the long fibers may vary depending on the location of reinforcement and the forces expected to be exerted on the housing component being reinforced.

In one or more embodiments, the housing component 122 is molded around the composite component 124. For example, the composite component 124 may be prepared from a composite material first, shaped to a desired preform, and melt consolidated. Thereafter, the composite component 124 may be placed in a mold, and molten thermoplastic polymer used to form the housing component 122 can be injected over or around the composite component 124 within the mold to form the housing component 122. The molten thermoplastic material of the housing component 122 can tackify the thermoplastic polymer of the composite component 124 to provide a strong attachment (physical, electrostatic, and/or chemical bonding) between the housing component 122 and the composite component 124. In one or more embodiments, the molten thermoplastic material of the housing component 122 melt bonds to the composite component 124, fusing to the thermoplastic polymer matrix of the composite component 124. In this way, no adhesive is needed to attach the housing component 122 to the composite component 124. In one or more embodiments, the composite component 124 is preheated or heated during deposition of the molten thermoplastic material to enhance the attachment between the composite component 124 and the molten thermoplastic polymer of the housing component 122.

In one or more other embodiments, the composite component 124 can be built up from one or more layers of unidirectional fibers bound in a thermoplastic polymer matrix (i.e., tapes) and/or from one or more layers of commingled structures (i.e., braided, woven, or knitted fabrics formed of the long fibers and fibers of the thermoplastic polymer). In one or more embodiments, the composite component 124 is built up by layering the composite tape with the unidirectional fibers having a different orientation in each layer. In an example of such an embodiment, a first layer of composite tape can have a 0° reference direction, and a second layer of composite tape can be rotated 900 relative to the first layer. Such a composite component of layered composite tapes may include alternating layers of, e.g., 0° and 90° or, e.g., 0°, 45°, 90°, and 135°. In this way, even though each layer has an axis of enhanced material properties, the combination of layers in composite component 124 has more uniform properties in a plurality of load directions, making the composite component 124 similar to a randomly oriented composite component. Further, the composite component 124 can be built up from layers of a commingled structure, such as a woven fabric including fibers woven at +/−45°. The layers of commingled structure can also alternate orientation, e.g., 0° and 900 or, e.g., 0°, 45°, 90°, and 135°. After building up the layered structure, the layers are melt consolidated by heating the layers of composite material to fuse the thermoplastic polymer within each layer and to fuse the thermoplastic polymer between layers.

In one or more embodiments, each layer of composite material has a thickness of from 0.1 mm to 0.5 mm, in particular 0.1 mm to 0.35 mm. In one or more embodiments, the composite component 124 includes from 1 layer of composite material to 30 layers of composite material. In one or more embodiments, the thickness of the composite component 124 is from 0.1 mm to 3 mm.

In one or more embodiments, the housing component 122 is formed from a thermoplastic polymer, in particular the same thermoplastic polymer used as the thermoplastic polymer matrix of the composite component 124 or a thermoplastic polymer that is compatible with the thermoplastic polymer used in the composite component 124. In one or more embodiments, the thermoplastic polymer of the housing component 122 is filled with short fibers, which are shorter than the long fibers of the composite component 124. Further, as used herein, fibers are considered "short" if most of the fibers (i.e., >50%) in the polymer of the housing component 122 have a length that is less than 0.5 inches long, in particular less than 0.25 inches long, and most particularly about 1⁄32 inch or less. In one or more embodiments, the short fibers include fibers in which at least 55%, at least 60%, at least 65%, at least 70%, at least 75%, at least 80%, at least 85%, at least 90%, at least 95%, or up to 100% of the fibers have a length of less than 0.5 inch. Such fibers are distinct from long fibers as described above. In one or more embodiments, the housing component 122 includes up to 20% by weight, up to 30% by weight, up to 40% by weight, up to 50% by weight, up to 60% by weight, or up to 70% by weight of the short fibers. In one or more embodiments, the housing component 122 includes at least 1% by weight, at least 5% by weight, or at least 10% by weight of short fibers. In one or more embodiments, the short fibers include fibers that are selected from glass fibers, carbon fibers, aramid fibers, basalt fibers, ultra-high molecular weight polyethylene fibers, and combinations thereof. The housing component 122 may also include various other additives, such as those listed above.

Whether the thermoplastic polymer of the housing component 122 includes short fibers may be based on the particular combination materials for the housing component 122 and the composite component 124. For example, the housing component 122 may be comprised of polycarbonate without short fibers, and the composite component 124 may be comprised of a polycarbonate matrix with long carbon fibers. In another example, the housing component 122 may be comprised of polyamide 66 filled with short fibers, and the composite component 124 may be comprised of polyamide 66 filled with long carbon or glass fibers. These are merely example embodiments, and other combinations and possibilities are envisioned.

In one or more embodiments, the composite component 124 is attached directly to housing component 122 through a physical, electrostatic, and/or chemical interaction. In one or more embodiments, the composite component 124 is formed from the same base polymer as the housing component 122. For example, if the housing component 122 is primarily formed from polyamide 66, then the thermoplastic polymer of the composite component 124 can also be selected to be polyamide 66. In this way, the polymer of the composite component 124 is compatible with and will attach to the primary polymer of the housing component 122, in particular without requiring an adhesive. In embodiments in which the housing component 122 is applied as a molten material, deposition of the molten material will facilitate melt-bonding between the composite component 124 and the housing component 122 as described above.

Figure 4:
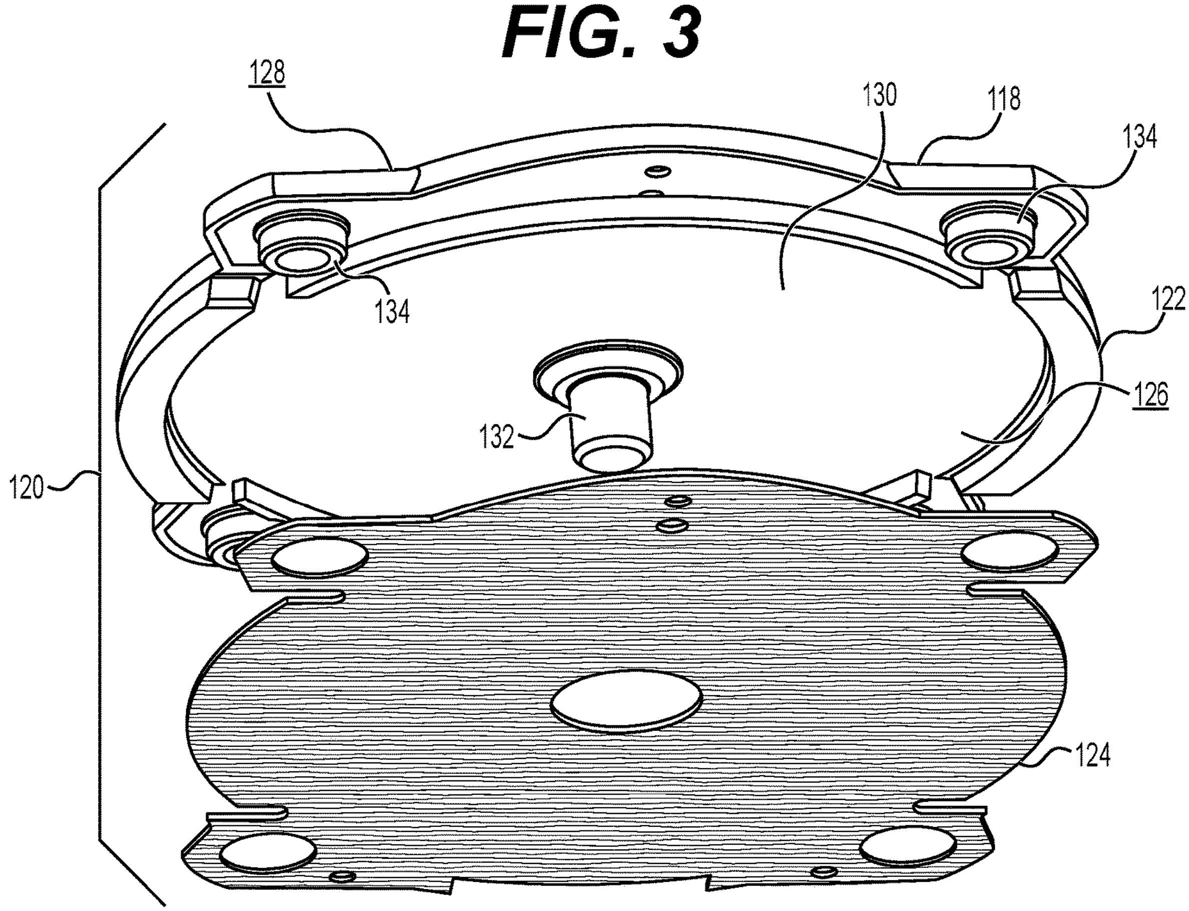
FIG. 4 depicts an exploded view of the hybrid composite component of FIG. 3, according to an embodiment of the present disclosure.

FIG. 4 depicts an exploded view of the hybrid composite component 120. The housing component 122 includes an interior surface 126 and an exterior surface 128 defining a housing wall 130. For an endcap 118, the housing wall 130 is substantially planar, but for other hybrid composite components 120, such as in the handle portion 108, the housing wall 130 may include one or more curvatures (e.g., including contours designed for engagement with an operator's hand). In one or more embodiments, the composite component 124 is a conformal layer over the planar or curved interior surface 126 of the housing wall 130.

Notwithstanding, the housing component 122 may include one or more projecting elements. For example, the endcap 118 shown in FIG. 4 includes a central alignment pin 132 extending from the interior surface 126 as well as collars 134 defining through holes for fasteners to attach the endcap 118 to the remainder of the housing 102. Advantageously, by forming the housing component 122 of the endcap 118 of a thermoplastic polymer (including or not including short fibers as the case may be), the complex geometry, including curved surfaces and projecting elements, can easily be molded through such techniques as injection or compression molding. Further, the composite component 124 can preformed in a planar structure or against a curved mold and then melt-consolidated to provide the desired shape. Thereafter, apertures or other cutout features can be formed into the composite component 124 to allow for molding of the complex geometries of the housing component 122 through or around the composite component 124 while also fusing the housing component 122 and the composite component 124 through melt bonding. For example, the composite component 124 can be formed in a large sheet from layers of composite tape, and the sheet can be cut or stamped to produce composite component 124 inserts that are joined to the housing component 122.

Figure 5:
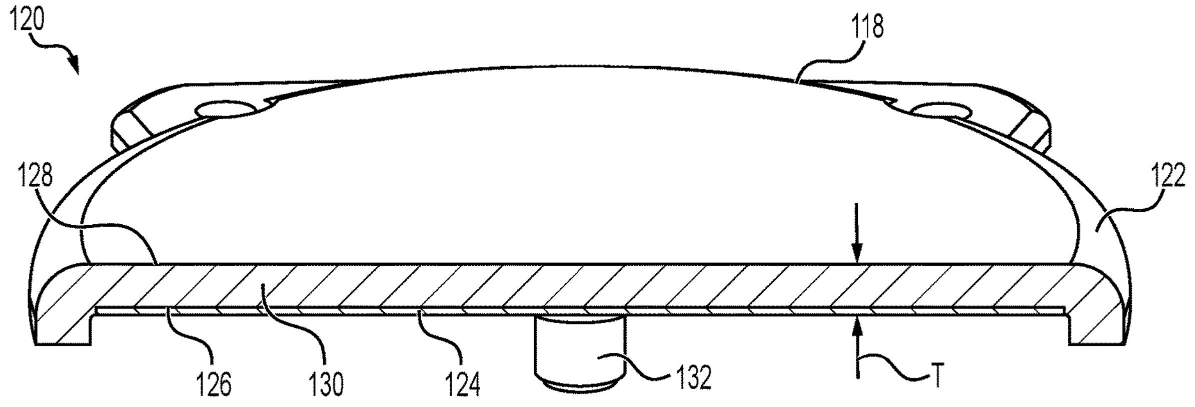
FIG. 5 depicts a cross-sectional view of the hybrid composite component of FIG. 3, according to an embodiment of the present disclosure.

FIG. 5 depicts a cross-sectional view of a hybrid composite component 120. The hybrid composite component 120 in the depiction of FIG. 5 is an endcap 118, but the following discussion applies as well to other hybrid composite components 120, such as handle portions 108 and battery packs 116 among others. As can be seen in FIG. 5, the housing wall 130 and composite component 124 define a total thickness T. In one or more embodiments, the composite component 124 comprises up to 80%, up to 70%, up to 60%, up to 50%, up to 40%, up to 30%, up to 20%, or up to 10% of the total thickness T. In one or more embodiments, the composite component 124 comprises at least 1%, at least 2%, at least 5%, or at least 10% of the total thickness T. In one or more particular embodiments, the composite component 124 comprises from 1% to 80%, in particular 50% to 80%, of the total thickness T.

Advantageously, the composite component 124 can be used to locally reinforce a housing 102 without increasing the thickness of the housing in that localized region. Using the endcap 118 as an example, the total thickness T of the endcap 118 may be the same as the wall thickness of a conventional, non-reinforced, fully plastic endcap. In this way, the endcap 118 is reinforced to enhance stiffness without requiring significant redesign of the housing 102. In one or more embodiments, the hybrid composite component 120 has double the stiffness as compared to a conventional, non-reinforced housing component. Further, the composite component 124 provides an additional level of protection for the housing 102 in instances where the housing component 122 cracks or is punctured. That is, cracks or punctures through the plastic housing component 122 are not automatically transferred through composite component 124. Thus, damage to the housing component 122 will not necessarily lead to a failure of the housing 102.

Figure 6:
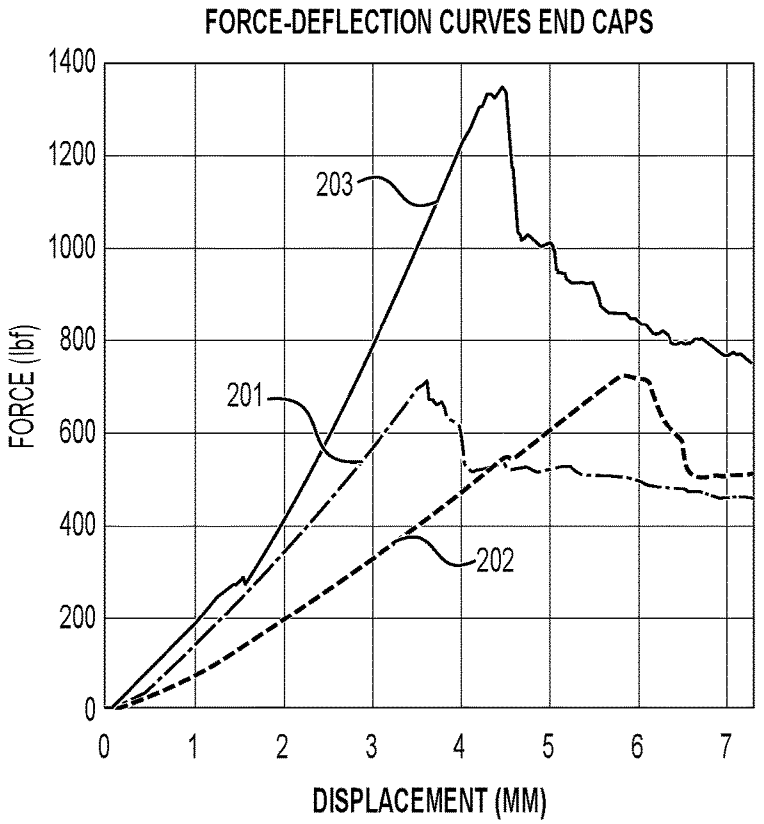
FIG. 6 depicts a graph of displacement plotted against force applied to an endcap, including one comparative example and two examples according to embodiments of the present disclosure.

FIG. 6 provides a graph of displacement (mm) against force (lbf) required to produce that displacement. The graph considers three samples. The first sample 201 is an example of a composite component 124 according to the present disclosure comprised of polyamide 66 (available from Avient Corporation, Avon Lake, Ohio) with 60% by weight of long glass fibers. The first sample 201 had a thickness of 0.90 mm and was made up of 8 unidirectional layers (alternated 0°/90°). As can be seen in FIG. 6, a deflection of about 3 mm for the first sample 201 requires over 550 lbf of force. The second sample 202 is a comparative example comprised of polyamide 6 (available from Kingfa Sci & Tech Co Ltd, Guangzhou, China) with 30% by weight of short glass fibers. As can be seen in FIG. 6, a deflection of 3 mm for the second sample 202 only requires about 325 lbf. Thus, using a higher amount of long fibers produces a significant increase in the force required for a given deflection. The third sample 203 is another example of a composite component 124 according to the present disclosure comprised of polyamide 6 (available from Celanese Corporation, Irving, Texas) with 60% by weight of long carbon fibers. The third sample 203 had a thickness of 0.90 mm and was made up of 8 unidirectional layers (alternated 0°/90°). As can be seen in FIG. 6, a deflection of 3 mm for the third sample 203 requires over 750 lbf of force.

Further, taking the first sample 201 and the second sample 202, the peak force that each is able to withstand is about 700 lbf. However, when such a force is applied, the first sample 201 only deflects about 3.6 mm, whereas the second sample 202 deflects about 5.7 mm. The third sample 203 exhibits an even higher peak force of over 1300 lbf, and at that force, the deflection is only about 4.3 mm. Thus, in terms of resistance to deflection under load, the samples according to the present disclosure provide enhanced stiffness compared to conventional short fiber composites.

Though portions of the foregoing description discuss an embodiment of a hybrid composite component 120 in the form of an endcap 118 of an impact driver, other portions of a power tool 100 can be locally reinforced with a composite component 124. With reference to FIG. 2, the previous discussion specifically mentioned localized reinforcement using the composite component 124 for reinforcing the handle portion 108 and for reinforcing the battery pack 116. For example, the handle portion 108 may be reinforced at first locations 136 where the handle portion 108 transitions to the second portion 106. Additionally or alternatively, the handle portion 108 may be reinforced at second locations 138 where the operator grips the handle portion 108. Additionally or alternatively, the handle portion 108 may be reinforced at locations 140 where the handle portion 108 transitions to the first portion 104. Such reinforcement can be provided to increase the force required to shatter the handle portion 108 when the power tool 100 is dropped.

As another example, the battery pack 116 may be reinforced along one or more of the top, bottom, or side walls 142. In one or more embodiments, the battery pack 116 is formed from an upper and lower housing that mate and are fastened together, and the top, bottom, and/or side walls 142 of each housing are reinforced with the composite component 124. Additionally or alternatively, the battery pack 116 may be reinforced at one or more of the corners 144. Such reinforcement of the battery pack 116 can help prevent damage to the battery cells contained in the battery pack 116 when the power tool 100 is dropped.

Figure 7:
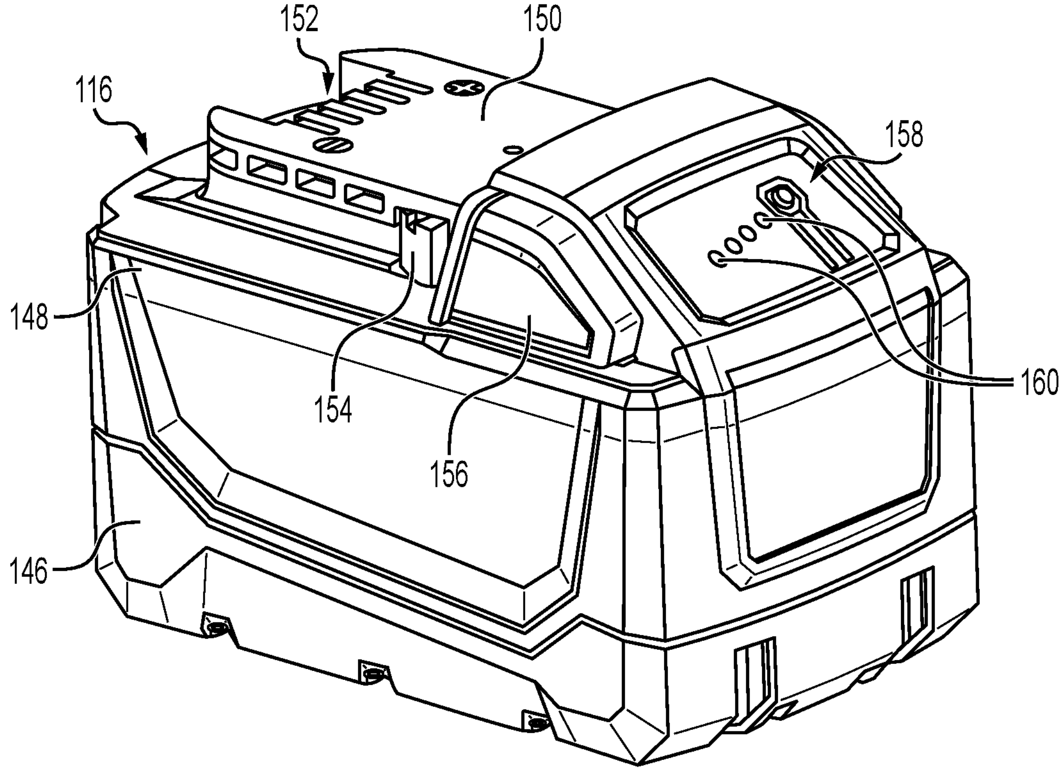
FIG. 7 depicts a perspective view of a battery pack that can be reinforced with a composite component, according to an embodiment of the present disclosure.

FIG. 7 depicts an exemplary embodiment of a battery pack 116. In one or more embodiments, the battery pack 116 includes a lower housing component 146 and an upper housing component 148. As can be seen in FIG. 7, the battery pack 116 may includes such features as a power tool/charging station attachment mount 150. The mount 150 includes electrical contacts 152 configured to allow for charging/discharging of battery cells (not shown) contained within the battery pack 116. The mount 150 may also include a locking element 154 and a release mechanism 156. When the mount 150 is fully inserted into a charging station or power tool, the locking element 154 may engage with the charging station or power tool to prevent the battery pack 116 from sliding free. Upon actuation of the release mechanism 156, the locking element 154 will disengage with the charging station or power tool. Additionally, the battery pack 116 may include a charge indicator 158, such as a set of LED lights 160 that indicate a charge level of the battery cells in the battery pack 116. Still further, the battery pack 116 may include control electronics designed to prevent overcharging and overheating of the battery cells.

Figure 8:
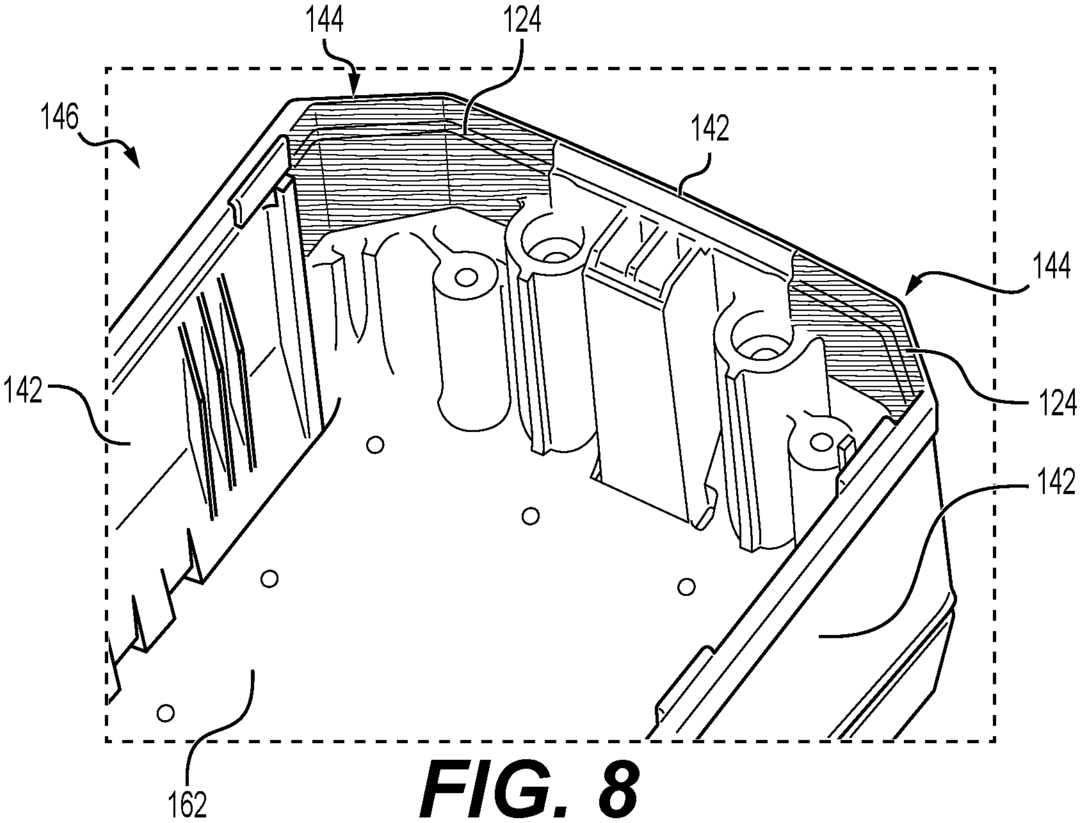
FIG. 8 depicts a lower housing component of the battery pack of FIG. 7 having corners reinforced with a composite component, according to an embodiment of the present disclosure.

FIG. 8 depicts the lower housing component 146. As can be seen, the lower housing component 146 includes a plurality of sidewalls 142. Disposed between the sidewalls 142 are corners 144, which in the embodiment shown in FIG. 8 are angled or multi-faceted corners. In one or more embodiments, one or more of the corners 144 is a hybrid composite component 120 in which the housing component 120 is reinforced with a composite component 124 as described above. FIG. 8 depicts the top corners 144 of the lower housing component 146 reinforced with the composite component 124, but in one or more other embodiments, the entire corner 144 or the bottom portion of the corner 144 may be reinforced. Additionally, all or part of a bottom wall 162 may be additionally or alternatively be reinforced with the composite component 124.

FIGS. 9-13 relate to another embodiment of a power tool 300, in particular a fastener driver, that includes a hybrid composite component. As can be seen in the embodiment depicted in FIG. 9, the fastener driver 300 is a handheld device configured to drive fasteners (such as nails, tacks, or staples, amongst other possibilities) fed from a magazine 302 into a workpiece. As with the embodiment of the power tool 100 described above, the fastener driver 300 includes a first portion 304 connected to a handle portion 308. The handle portion 308 is in turn connected to a second portion 306. In one or more embodiments, the head portion 306 includes an end effector 310, which is configured to drive fasteners, in particular using a gas spring mechanism. The handle portion 308 includes a trigger 312 formed therein to actuate the end effector 310. The first portion 304, the handle portion 308, and the second portion 306 make up a housing 314 of the fastener driver 300. Further, in the embodiment shown, the second portion 306 is configured to receive a battery pack 316. As described above, the housing 314 and/or battery pack 316 of the fastener driver 300 may include one or more local areas that are reinforced with a composite component. Additionally, for the fastener driver 300, internal components of the gas spring mechanism are also suitable for reinforcing with a composite component, and the following simplified discussion of the operation of the fastener driver 300 serves to identify the particular component suitable for reinforcement.

Figure 9:
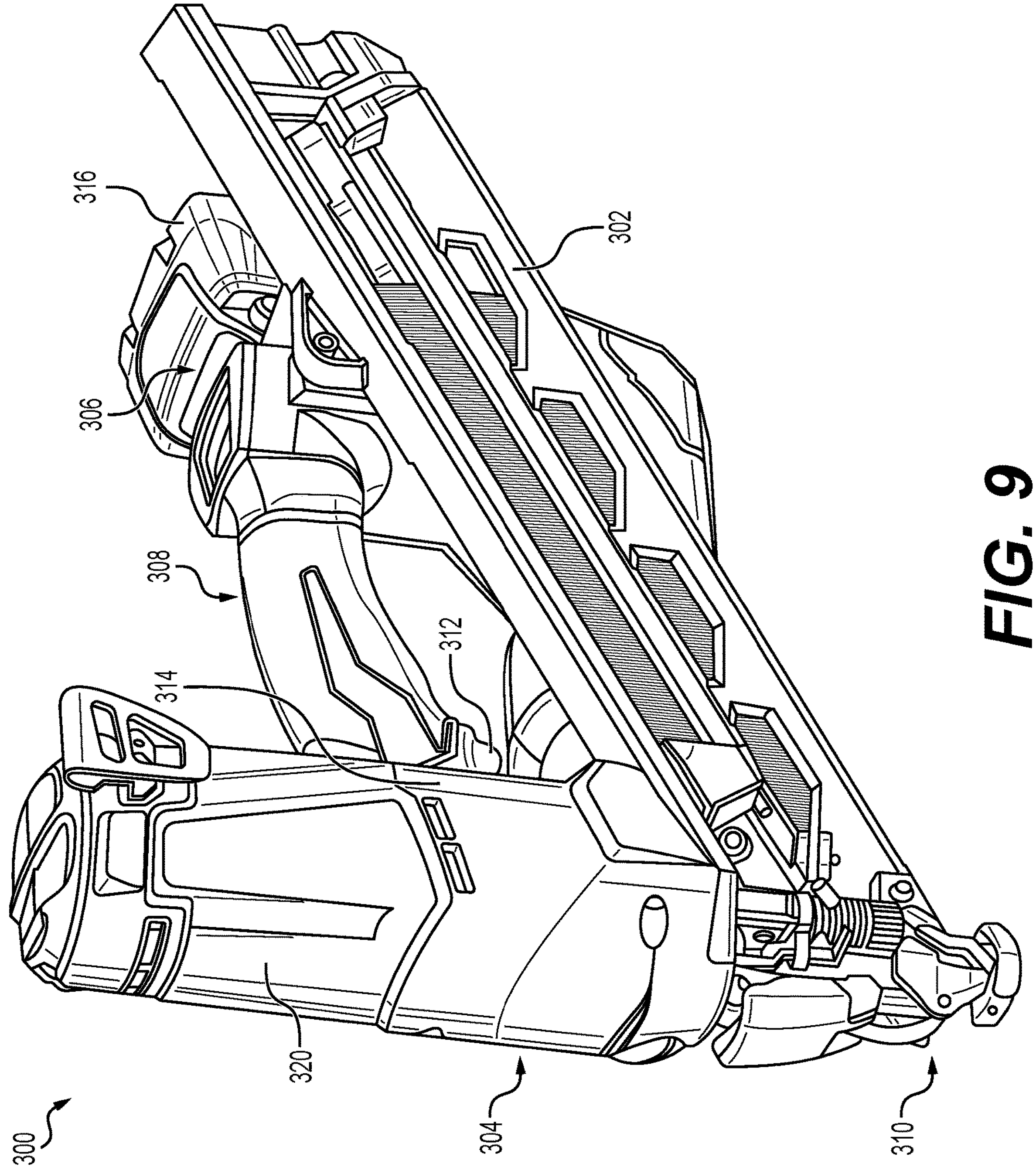
FIG. 9 depicts a perspective view of a fastener driver having one or more components reinforced with a composite component, according to an embodiment of the present disclosure.
Figure 10:
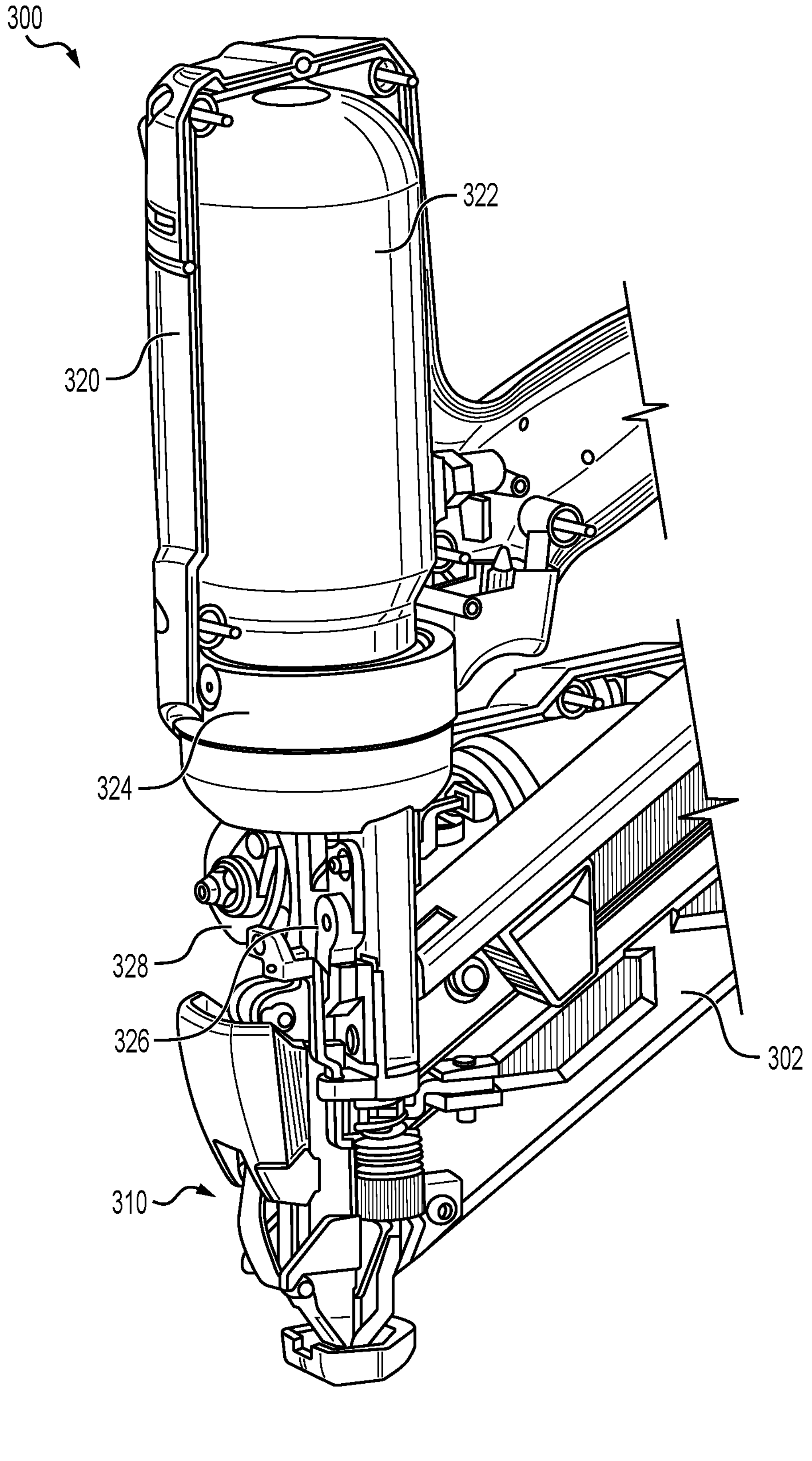
FIG. 10 depicts a partial cut-away view of a cylinder housing of the fastener driver of FIG. 9, according to an embodiment of the present disclosure.

As shown in FIG. 9, the first portion 304 includes a cylinder housing 320. FIG. 10 provides a partial cut-away view of the first portion 304, including the cylinder housing 320. As can be seen in FIG. 10, the cylinder housing 320 surrounds a storage chamber cylinder 322 containing a pressurized gas. The storage chamber cylinder 322 is mounted in a cylinder support 324. The mechanical components of the end effector 310 are arranged linearly in registration with the storage chamber cylinder 322 such that the cylinder support is disposed between the storage chamber cylinder 322 and the end effector 310. The end effector 310 includes a latch assembly 326 and a lifting assembly 328 that control the positioning of a driver blade 330 as shown in the cross-sectional view of FIG. 11.

Figure 11:
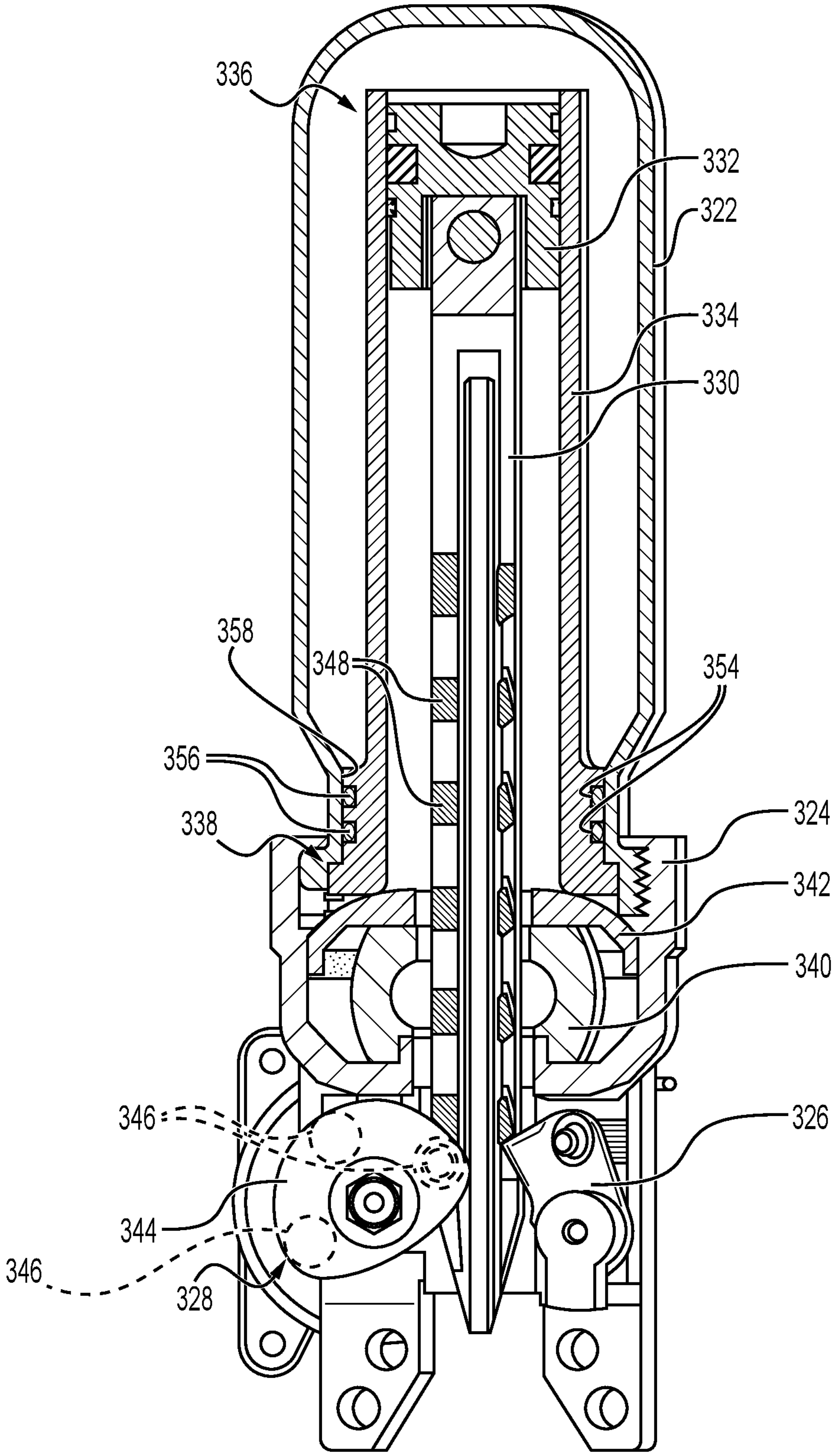
FIG. 11 depicts a cross-sectional view of the cylinder housing and end effector of the fastener driver of FIGS. 9 and 10, according to an embodiment of the present disclosure.

As can be seen in FIG. 11, the driver blade 330 is connected to a piston 332 contained within a piston sleeve 334 that is contained within the storage chamber cylinder 322. In the embodiment shown in FIG. 11, the piston 332 and, thus, driver blade 330 are in the ready position at a first end 336 of the piston sleeve 334 distal to the cylinder support 324. As mentioned, the storage chamber cylinder 322 is filled with pressurized gas, and when the latch assembly 326 is released, the pressurized gas in the storage chamber cylinder 322 drives the piston 332 towards a second end 338 of the piston sleeve 334 proximal to the cylinder support 324. Disposed within the cylinder support 324 are a bumper 340 and a conical washer 342. The bumper 340 absorbs the impact energy of the piston 332, and the conical washer 342 distributes the impact force of the piston 332 uniformly over the bumper 340. After driving of the piston 332, the lifting assembly 328 engages the driver blade 330 to return the piston 332 to the ready position at the first end 336 of the piston sleeve 334. In particular, the lifting assembly 328 includes a cam 344 having a plurality of pins 346 configured to engage teeth 348 of the drive blade 330. The cam 344 is attached to a shaft that is driven by a motor such that, after actuation of the trigger 312, which releases the latch assembly 326, the lifting assembly 328 returns the drive blade 330 and piston 332 to the ready position. A more detailed explanation of the operation of the fastener driver 300 can be found in Applicant's U.S. Pat. No. 10,173,310, "Gas Spring-Powered Fastener Driver," issued on Jan. 8, 2019, the entire contents of which are incorporated herein by reference thereto.

Figure 12:
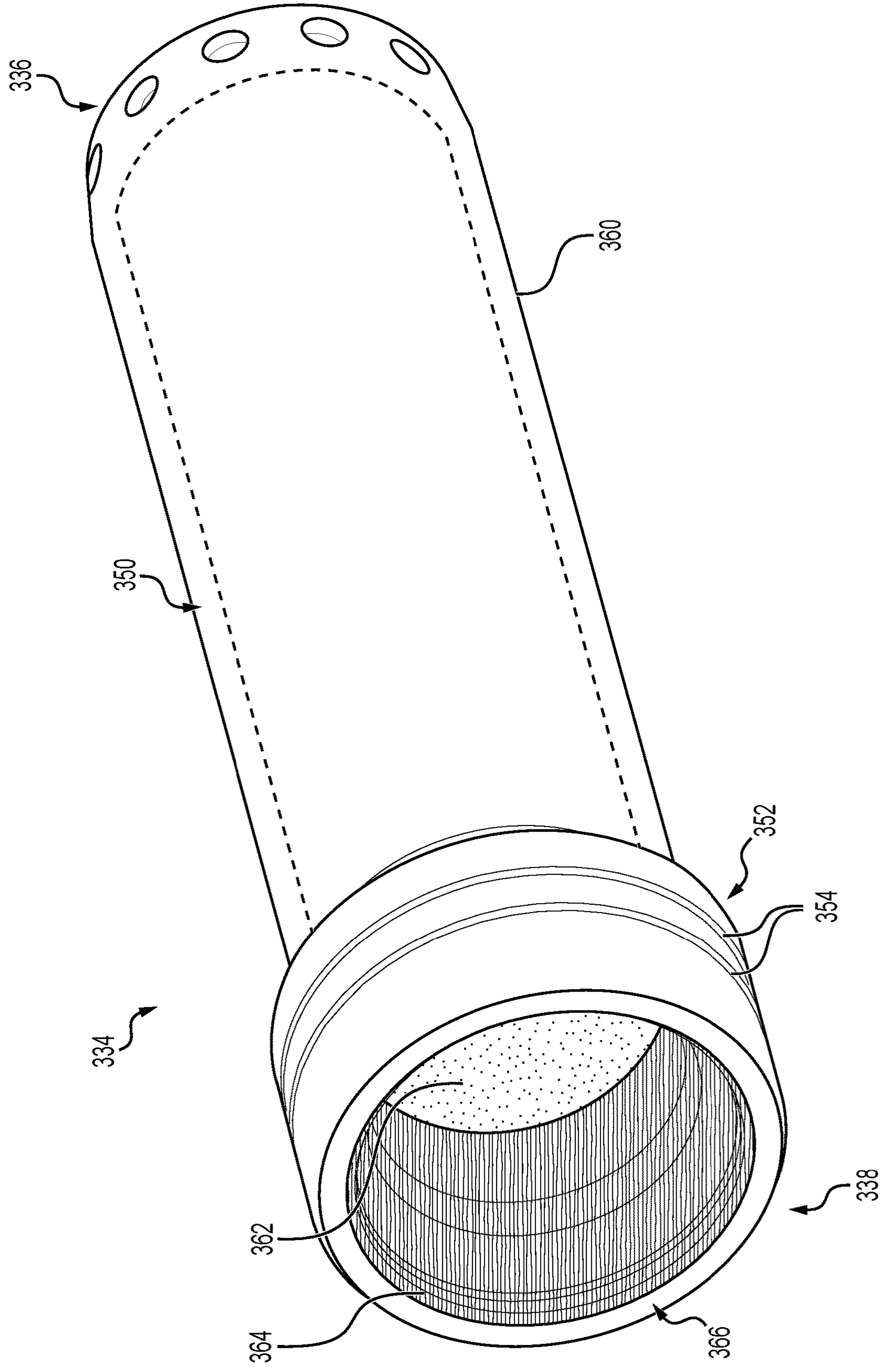
FIG. 12 depicts a perspective view of a piston sleeve having a collar reinforced with a composite component, according to an embodiment of the present disclosure.

Having described the operation of the fastener driver 300, the component that is particularly suitable for reinforcement with the composite component is the piston sleeve 334 as shown in FIG. 12. In one or more embodiments, the piston sleeve 334 includes cylindrical tube 350 with a collar 352. In one or more embodiments, collar 352 includes one or more grooves 354 configured to carry a gasket 356 (as shown in FIG. 11). The collar 352 and gaskets 356 engage an inner wall 358 of the storage chamber cylinder 322 to provide a fluid tight seal.

Returning to FIG. 12, the piston sleeve 334 includes an outer layer 360 that is comprised of a thermoplastic polymer. In one or more embodiments, the thermoplastic polymer may include short fibers. In one or more embodiments, the thermoplastic polymer and short fibers of the outer layer 360 correspond to the thermoplastic polymers and short fibers described above in relation to the housing component 122.

In the cylindrical tube 350, the outer layer 360 surrounds an aluminum bore 362, which provides the sliding surface for the piston 332. The aluminum bore 362 extends from the first end 336 of the piston sleeve 334 to (but not into) the collar 352.

Within the collar 352, the piston sleeve 334 is lined with a composite component 364. The composite component 364 includes a thermoplastic polymer matrix and long fibers as described above in relation to the composite component 124, including in terms of the selection of the thermoplastic polymers of the matrix; the type, length, and orientation of the long fibers; layered or unlayered structure; and relative thickness as compared to the total thickness. Further, as described above, the composite component 364 is joined to the outer layer 360 without adhesive, in particular by melt bonding of the thermoplastic polymer matrix of the composite component 364 to the thermoplastic polymer of the outer layer 360. Thus, the piston sleeve 334 includes a hybrid composite component 366 in the form of the composite component 364 as a local reinforcement for the collar 352 of the outer housing 360.

Figure 13:
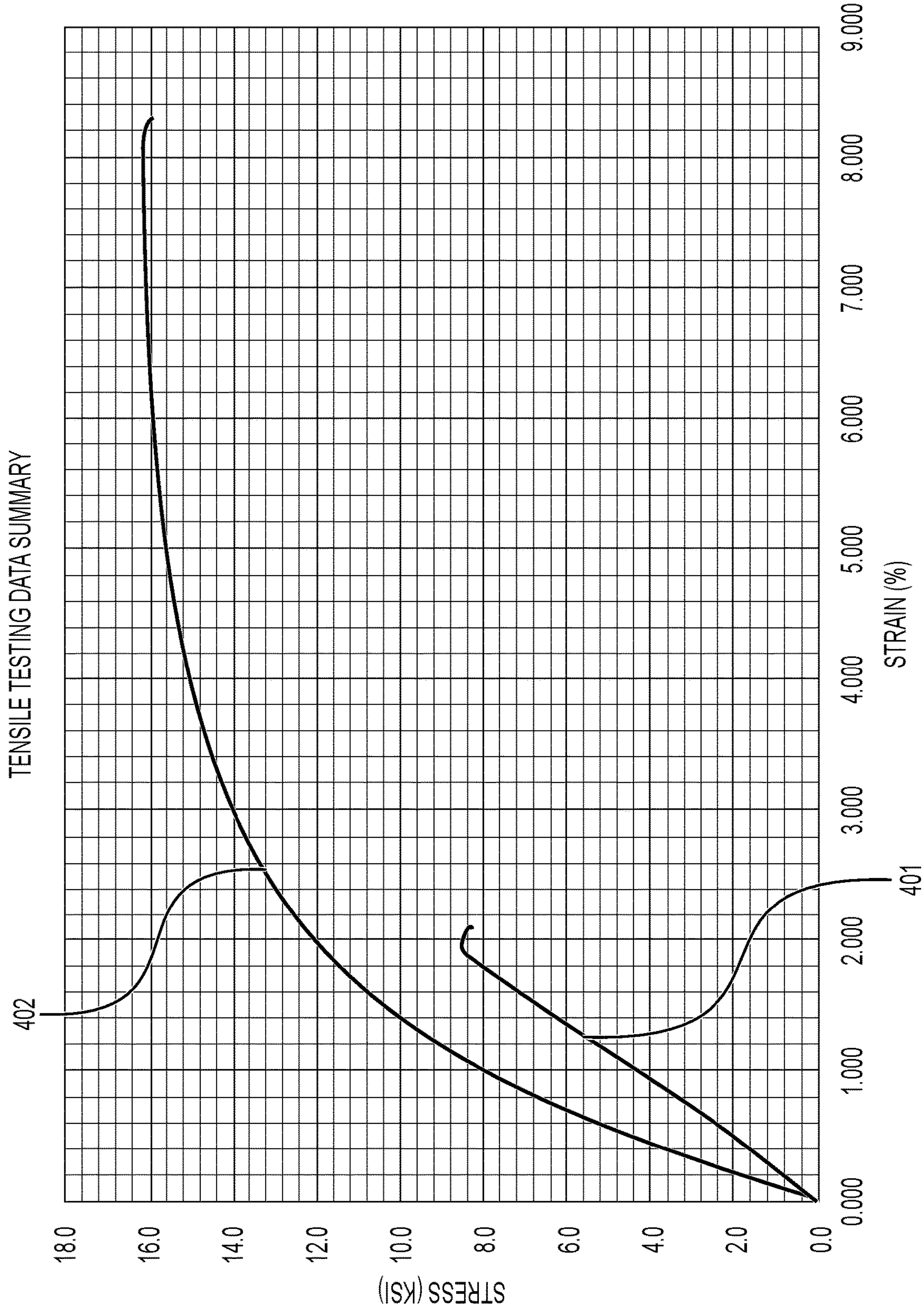
FIG. 13 depicts tensile stress-strain curves for an existing piston sleeve design and for a piston sleeve design having a composite component reinforcement according to an embodiment of the present disclosure.

In certain existing piston sleeve designs, the collar is not locally reinforced, and after the outer layer was injection molded around the aluminum bore, the collar may develop a crack extending from the second end to the cylindrical tube along the injection molding weld line. FIG. 13 provides a graph of the tensile strength of the existing piston sleeve design as compared to the piston sleeve 334 having the hybrid composite component 364 according to the present disclosure. The samples used to generate the graph were conditioned to 1.7% moisture content and subjected to tensile loading. A stress-strain curve 401 for the existing design exhibited a tensile strength of less than 9 ksi at a strain of about 2%. By contrast, a stress-strain curve 402 for the piston sleeve 334 according to the present disclosure exhibited a tensile strength of over 16 ksi at a strain of greater than 8%. Accordingly, locally reinforcing the collar 352 with a composite component 364 substantially strengths the piston sleeve 334 of the fastener driver 300 to prevent cracking along the injection molding weld line under typical operating conditions.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

The invention claimed is:

1. A power tool, comprising:

at least one hybrid composite component, the hybrid composite component comprising a housing component and a composite component;

wherein the composite component is configured to reinforce the housing component;

wherein the composite component is made of a first thermoplastic polymer matrix filled with long fibers; and wherein most of the long fibers have a length of at least 0.5 inches.

2. The power tool of claim 1, wherein the first thermoplastic polymer matrix of the composite component includes at least one of a polyamide (PA), a polycarbonate (PC), a polypropylene (PP), polyphthalamide (PPA), poly (butylene terephthalate) (PBT), poly (acrylonitrile:budadiene:styrene) (ABS), or polyketone (POK).

3. The power tool of claim 1, wherein the long fibers include fibers selected from glass, carbon, aramid, basalt, ultra-high molecular weight polyethylene, and combinations thereof.

4. The power tool of claim 1, wherein the long fibers are randomly oriented.

5. The power tool of claim 1, wherein most of the long fibers are oriented within 15° of a common direction.

6. The power tool of claim 1, wherein the composite component includes a plurality of layers and wherein each layer of the plurality of layers includes the first thermoplastic polymer matrix filled with the long fibers.

7. The power tool of claim 1, wherein the hybrid composite component has a thickness and wherein the composite component makes up to 80% of the thickness.

8. The power tool of claim 1, wherein the composite component is attached to the housing component without adhesive.

9. The power tool of claim 1, wherein the housing component is formed from a same thermoplastic polymer as the first thermoplastic polymer matrix or a second thermoplastic polymer that is compatible with the first thermoplastic polymer matrix.

10. The power tool of claim 9, wherein the housing component comprises short fibers embedded in the same thermoplastic polymer or the second thermoplastic polymer and wherein most of the short fibers have a length of less than 0.5 inches.

11. The power tool of claim 1, wherein the at least one hybrid composite component comprises an endcap of an impact driver.

12. The power tool of claim 1, wherein the at least one hybrid composite component comprises a handle portion.

13. The power tool of claim 1, wherein the at least one hybrid composite component comprises a battery pack.

14. The power tool of claim 1, wherein the power tool is a fastener driver comprising a gas spring mechanism, wherein the gas spring mechanism comprises a piston sleeve, and wherein the at least one hybrid composite component comprises the piston sleeve.

15. A power tool, comprising:

a housing comprising a first thermoplastic polymer; and a composite component, the composite component reinforcing a local area of the housing;

wherein the composite component comprises a matrix filled with long fibers, the matrix comprising a second thermoplastic polymer; and wherein the first thermoplastic polymer of the housing is melt bonded to the second thermoplastic polymer of the composite component.

16. The power tool of claim 15, wherein most of the long fibers have a length of at least 0.5 inches.

17. The power tool of claim 15, wherein the composite component comprises from 50% by weight to 70% by weight of the long fibers.

18. The power tool of claim 15, wherein the composite component comprises a first thickness in a range from 0.1 mm to 3 mm.

19. The power tool of claim 18, wherein the local area of the housing has a second thickness, wherein the first thickness and the second thickness together equal a total thickness, and wherein the first thickness is up to 80% of the total thickness.

20. A power tool, comprising:

at least one hybrid composite component, the hybrid composite component comprising a housing component and a composite component;

wherein the composite component is made of a first thermoplastic polymer matrix filled with long fibers;

wherein most of the long fibers have a length of at least 0.5 inches;

wherein the composite component includes a plurality of layers and wherein each layer of the plurality of layers includes the first thermoplastic polymer matrix filled with the long fibers; and wherein the long fibers in each layer of the plurality of layers are oriented within 15° of a common direction and wherein the common direction of a first layer of the plurality of layers is rotated about 45° or about 90° to the common direction of an adjacent second layer of the plurality of layers.

* * * * *